United States Patent
Zhou

(10) Patent No.: US 6,349,589 B1
(45) Date of Patent: Feb. 26, 2002

(54) DIAGNOSIS PROCESS OF VACUUM FAILURE IN A VACUUM CHAMBER

(75) Inventor: Jiaxiang Zhou, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/374,023

(22) Filed: Aug. 13, 1999

Related U.S. Application Data

(62) Division of application No. 08/918,480, filed on Aug. 26, 1997, now Pat. No. 5,979,225.

(51) Int. Cl.$^7$ .............................................. G01M 3/24
(52) U.S. Cl. ............................. 73/40; 73/40.7; 73/49.2
(58) Field of Search ..................... 73/40, 40.7, 49.2; 417/1, 9, 19

(56) References Cited

U.S. PATENT DOCUMENTS

| | | | |
|---|---|---|---|
| 3,085,198 A | 4/1963 | Briggs et al. ................. 73/40.7 |
| 3,800,586 A | 4/1974 | Delatorre et al. ............ 73/49.2 |
| 4,409,817 A | 10/1983 | Edwards, Jr. ................. 73/40.7 |
| 4,492,110 A | 1/1985 | Bergquist .................... 73/40.7 |
| 4,918,930 A | * 4/1990 | Gaudet et al. ................ 62/55.5 |
| 4,947,352 A | * 8/1990 | Jenkins ........................... 73/52 |
| 4,984,450 A | * 1/1991 | Burger ......................... 73/40.7 |
| 5,365,772 A | 11/1994 | Ueda et al. .................. 73/40.7 |
| 5,526,678 A | * 6/1996 | Shaw et al. ..................... 73/40 |
| 5,777,209 A | 7/1998 | Tien ............................ 73/40.7 |

* cited by examiner

Primary Examiner—Hezron Williams
Assistant Examiner—Michael Cygan
(74) Attorney, Agent, or Firm—Moser, Patterson & Sheridan, LLP

(57) ABSTRACT

A quick set of procedures for diagnosing the cause of a failure in a vacuum system having a pump and a chamber is disclosed. If the base pressure of the system has failed, but the rate of rise has not, then the most likely cause of the failure may be in the pump. If the rate of rise has failed, but the base pressure has not, then the most likely cause of the failure may be in the chamber. If the base pressure and rate of rise have both failed, then the most likely cause of the failure is in the chamber, but there is a slight chance of a failure in the pump. Measurements of the partial pressures of certain residual gases in the system may indicate a leak in the system. Measurements of the partial pressures of certain residual gases while turning off and on the lamps in the system may indicate a leak in the lamps. Measurements of the partial pressure of helium or other relevant gas, while moving a source of helium around the outside surface of the system, may determine the location of a leak.

13 Claims, 9 Drawing Sheets ic chips are made. The manufacturing of IC chips requires
DIAGNOSIS PROCESS OF VACUUM FAILURE IN A VACUUM CHAMBER This is a divisional of application (s) Ser. No. 08/918,480 filed on Aug. 26, 1997 now U.S. Pat. No. 5,979,225.

FIELD OF THE INVENTION

The present invention relates generally to diagnosing, or troubleshooting, problems or failures in vacuum systems. More specifically, the present invention relates to a method for quickly determining the location or cause of a failure in the ability of a vacuum system to create or maintain a desired vacuum setpoint pressure for the manufacturing of silicon wafers.

BACKGROUND OF THE INVENTION

A silicon wafer is the material on which integrated circuit (IC) chips are made. The manufacturing of IC chips requires a very high-vacuum environment. A suitable high-vacuum environment may be created with a properly designed and manufactured vacuum system. Vacuum systems for the manufacturing of IC chips on silicon wafers are generally known. There are many associated parts to a vacuum system, but it can generally be described as having two main sections: the pump and the chamber. These two sections are generally divided by a gate valve, which seals the two sections off from each other.

After assembling a vacuum system, the vacuum system is tested at a high vacuum setpoint pressure at least as high as the vacuum that it will be expected to achieve when actually manufacturing IC chips on silicon wafers. The vacuum test essentially qualifies the system to be operated at pressures up to the high vacuum setpoint pressure. This test may take up to several hours or days to perform, because the first time that a new system is subjected to a high vacuum, various types of impurities and contaminants may be in the system, having been introduced into the parts of the assembly during its manufacture. The impurities and contaminants will desorb from the surfaces of the interior of the system when subjected to a vacuum. A greater contamination will cause a faster desorption rate of gases from the interior surfaces into the interior space, and a faster introduction of gases into the interior space results in a longer time to achieve the setpoint pressure. A vacuum system may become recontaminated after the first vacuum period, but typically not to the extent of contamination prior to the first vacuum period, so the vacuum test typically takes longer to achieve the setpoint pressure than do subsequent vacuum periods. The bakeout period is the time that the system is subjected to a high vacuum, during which the impurities and contaminants are desorbed and removed from the interior of the system, prior to determining the setpoint pressure. The vacuum test ends when the vacuum of the system reaches the desired vacuum setpoint pressure and is able to maintain it after the expected time for the test has elapsed.

If the vacuum system fails the test, then it will have to be fixed, or the system will have to be scrapped. These vacuum systems can be very expensive, making it very undesirable to have to scrap an entire system. Therefore, the manufacturer of the system will usually try to troubleshoot the problem in order to save the system. Troubleshooting involves diagnosing the problem and repairing it.

The base pressure of a vacuum system is the lowest pressure down to which the system can be pumped. If the base pressure can reach or exceed the qualifying base pressure, the setpoint pressure, e.g. $6.0 \times 10^{-9}$ torr, then the vacuum system has passed the vacuum test. The base pressure is determined by measuring the pressure after bakeout while the pump holds the system steady at the ultra high vacuum. If the base pressure has not reached the qualifying base pressure, then the vacuum system has failed the base pressure test, and troubleshooting may be required.

The rate of rise (ROR) of a vacuum system is the rate at which the pressure inside the chamber rises after the chamber has been isolated from the pump by closing the gate valve. The ROR is measured by closing off the gate valve and measuring the pressure over a period of time, e.g. 2 minutes. If the pressure rises slowly enough, e.g. at a qualifying ROR of $1.5 \times 10^{-6}$ torr/2 min or less, then the vacuum system has passed the ROR vacuum test. If the pressure rises faster than the qualifying ROR, then the vacuum system has failed, and additional troubleshooting may be required.

Troubleshooting involves determining the cause of the base pressure and/or ROR failure. Problems arise when the nature of the cause is not readily apparent. An operator may replace various components of the vacuum system and then retest the system, but without a clear indication of the nature of the cause of the failure, the operator is left uncertain over which parts to replace. Indiscriminate or random replacement of components and retesting can be both timeconsuming and costly.

It is, therefore, desirable to have a method of diagnosing a vacuum system that has a failed base pressure or ROR, that quickly identifies the most likely cause of the failure.

SUMMARY OF THE INVENTION

Generally, a method for locating the cause of a failure in a vacuum system includes determining whether the base pressure (Pb), or rate of rise (ROR), or both has failed. This failure information is then compared with known categories of failure for various components or sections of the vacuum system, including the chamber or the pump.

One category of failure may be: the Pb has failed and the ROR has not failed. This category suggests that the pump is most likely responsible for the failure. Another category of failure may be: the base pressure has not failed and the rate of rise has failed. This category suggests that the chamber is most likely responsible for the failure. A third category of failure may be: the base pressure has failed and the rate of rise has failed. This category suggests that the chamber is most likely responsible for the failure.

Measurements with an RGA of the partial pressures of certain residual gases in the system may indicate a leak in the system when relative partial pressures of some of the residual gases are higher than certain others. Additionally, a bakeout lamp, containing a gas, may be used in the chamber to heat the chamber during vacuum testing, and a leak from the lamp may be indicated when the partial pressure of the same gas that is in the lamp changes as the lamp is turned on and off.

The cause of a failure in either section may be further narrowed by comparing the quantities of certain substances in the system, measured by an RGA, wherein a leak may be indicated when one or more particular substances is present in a greater quantity than expected. Additionally, the location of a leak may be determined by moving a source of a particular gas around the outside surface of either section while monitoring the quantity of that substance in the system, so that when the quantity of the substance in the system goes up, the location of the leak is determined.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

A vacuum system passes the vacuum test when its base pressure (Pb) is below a qualifying pressure and its rate of rise (ROR) is below an acceptable level. A method for diagnosing the cause of a failure in either of these parameters for a vacuum system includes a step-by-step procedure for narrowing the cause to the most likely component in the system by using known behavioral characteristics of such systems under given conditions. First, the pass/fail conditions of both the Pb and ROR permit the failure to be placed in one of three categories that indicate an initial suspected general location of the failure. For instance, a situation in which the Pb fails and the ROR passes their qualifying conditions indicates a Failure Category 1. A situation in which the Pb passes and the ROR fails indicates a Failure Category 2. Finally, a situation in which both the Pb and the ROR fail indicates a Failure Category 3. As will be explained in detail below, Failure Category 1 suggests a failure in the pump side of the system, and Failure Categories 2 and 3 both suggest a failure in the chamber side of the system, but with some variation. After the category, and hence the general location of the failure, is determined, then different measurement techniques with a residual gas analyzer (RGA) will help narrow the cause or location of the failure even further. When the cause of the failure is determined with as much specificity as possible, then the appropriate action may be taken and the system subjected to a retest to confirm that the problem has been solved.

Figure 1:
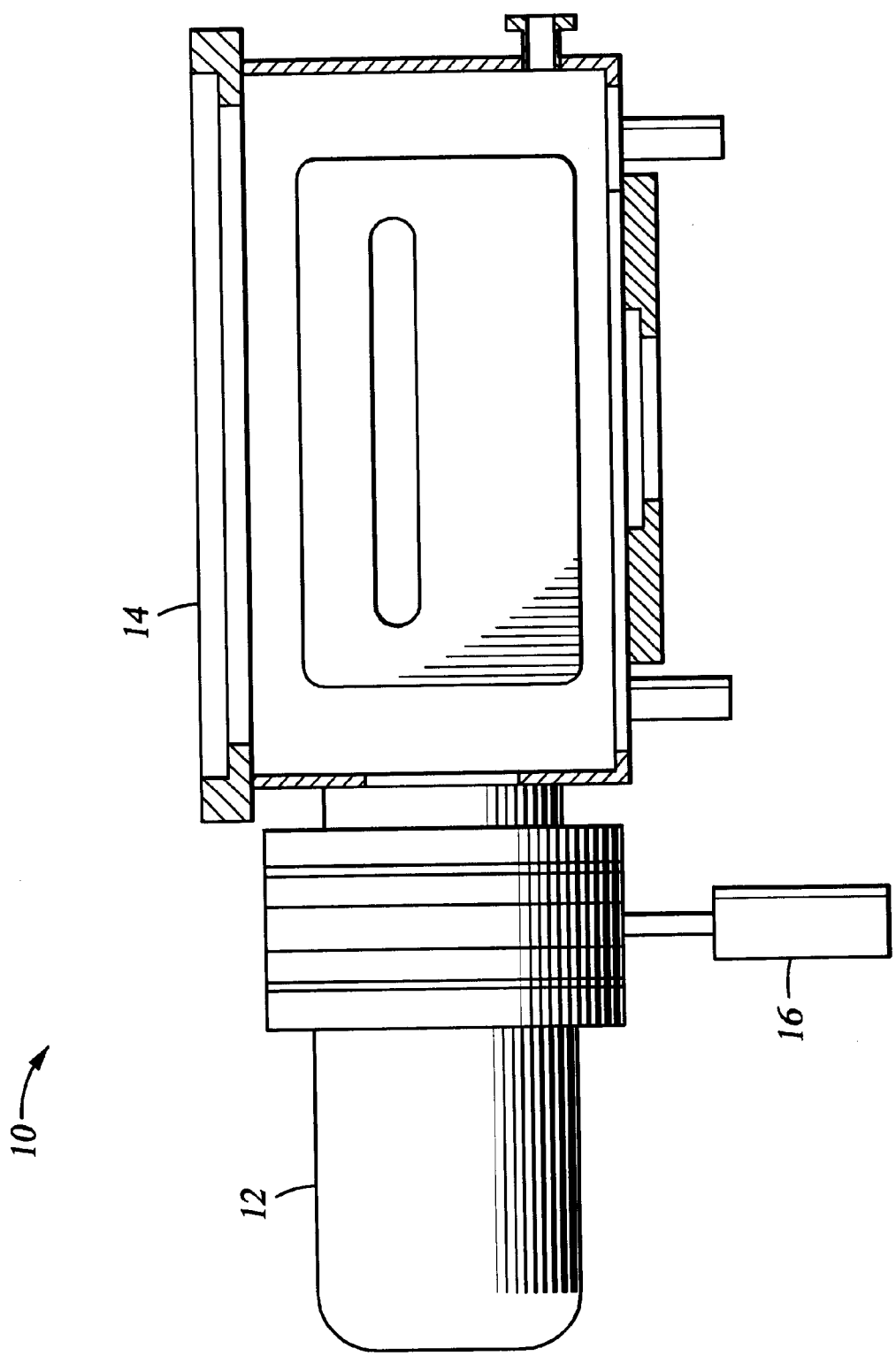
FIG. 1 shows a vacuum system that may be used with the present invention.

FIG. 1 generally shows a vacuum system 10, which may incorporate the present invention, having a pump 12 mounted on a chamber 14. A gate valve 16 generally separates the pump 12 and the chamber 14. When gate valve 16 is open, the pump 12 and the chamber 14 are in communication with each other; and when gate valve 16 is closed, the pump 12 and the chamber 14 are isolated from each other.

The vacuum system 10 may be any kind of system that has a pump that reduces the pressure of the chamber. The described embodiment relates to any vacuum system used in manufacturing IC's on silicon wafers, including a physical vapor deposition (PVD) vacuum system, a chemical vapor deposition (CVD) vacuum system, an etch vacuum system, etc. The described embodiment specifically shows a PVD vacuum system, but it is to be understood that the present invention is not restricted to this one embodiment.

Pump 12 may include a pump for high vacuum pumping. Additionally, a roughing pump is connected through a foreline to chamber 14 in a known manner. Except where specifically noted, references to a pump in this description are to the high vacuum pump since the vacuum test described herein operates in the high vacuum region. High vacuum pumps include a cryogenic pump (sometimes called a cryopump), a turbomolecular pump, and a getter pump. In the following description, the invention is described as including a cryopump; however, it should be understood that any of the other types of high vacuum pumps could be used in accordance with the present invention.

When gate valve 16 is open, the pump can pump down chamber 14 and maintain both sections in a high vacuum. When gate valve 16 is closed, the pump will usually continue to try to maintain the high vacuum; but since it is cut off from its pump, the vacuum in chamber 14 has nothing to maintain it, so the pressure in the chamber can rise if there is a source for gases to enter it. In fact, it is expected that small amounts of gases may continue to desorb from the interior surfaces of the chamber causing a normal rise in the chamber pressure when the gate valve is closed. A failure in chamber 14, however, may cause its pressure to rise unacceptably.

Chamber 14 may include an ion gauge, not shown, for measuring the low pressures in the chamber 14 at which most other gauges cannot operate. The ion gauge may also show the change in pressure over time. When gate valve 16 is open, the ion gauge shows the pressure in both chamber 14 and pump 12. When gate valve 16 is closed, the ion gauge shows the pressure only in chamber 14.

Chamber 14 may also include a set of bakeout lamps, not shown. A typical bakeout lamp contains 99% Ar and 1% $N_2$. The lamps may be used during bakeout and during actual manufacturing of IC's on the wafers.

Vacuum chambers typically have a lid for an operator to access the interior of the chamber. The lid is typically sealed to the chamber with an O-ring. An O-ring, however, does not provide the best seal possible for a vacuum chamber, because water vapor and other gases can permeate through an O-ring into the vacuum chamber. There are other ways to seal a vacuum chamber that provide a much better seal, but these other ways require much more time to open and close the vacuum chamber, which is unacceptable in commercial uses, where speed is important. Therefore, vacuum chambers used in the semiconductor industry accept the O-ring seal. The fact that water vapor can permeate through an O-ring seal will be used in one of the diagnostic steps described below.

As stated briefly before, the first step to quickly diagnosing a failure in a vacuum system is to determine to which of three categories the failure corresponds. The categories depend on whether the base pressure or the rate of rise or both has failed. These diagnosis procedures are performed after the vacuum test and with a room-temperature vacuum system 10, so that every system is measured under the same standard criteria.

When a vacuum system 10 has a leak, ambient air is entering the system only to be pumped back out again by the pump. If the leak is small enough, then the pump can keep up with it and maintain the base pressure at the qualifying pressure. Sometimes, however, the leak will be too great for the pump and the base pressure will not reach the qualifying pressure. A typical qualifying pressure for a PVD chamber is about $6.0 \times 10^{-9}$ torr or less.

When there is a leak in pump 12 or gate valve 16, then the rate of rise will provide no indication thereof, since rate of rise is determined when chamber 14 is sealed off from pump 12 or gate valve 16. Therefore, the only indication of a leak on the pump side may be a failure in the base pressure. A failure in the base pressure with no failure in the rate of rise is Failure Category 1, and indicates the failure was caused on the pump side of vacuum system 10.

When the pump is operating slowly or inefficiently, then the vacuum system may not reach its qualifying pressure, so the system will show a failure in its base pressure. The rate of rise may still meet the specification, since it does not directly depend on the conditions on the pump side. Therefore, a slow or inefficient pump may present a Category 1 failure. If the pump has been operated properly, however, it will not be very likely to fail, so the more likely cause of a Category 1 failure is a pump-side leak as described above.

When the ion gauge is contaminated and not working properly, it may read a pressure that is much higher than the actual pressure. Thus, in an ultra-high vacuum range, an ion gauge failure may falsely show a failed base pressure. The rate of rise will not be affected by an ion gauge failure, since the ion gauge may still show the relative change in pressure, although the indicated pressures are off scale. Therefore, a failed ion gauge may present a Category 1 failure.

With current bakeout procedures, however, it has become very unusual for an ion gauge to become contaminated, so a failed ion gauge is an unlikely cause of a Category I failure.

When chamber 14 has a leak, the base pressure could pass, if the pump can keep up with the leak, or fail, but more importantly, the rate of rise will likely fail. A passing rate of rise for a PVD chamber is typically about $1.5 \times 10^{-6}$ torr/2 min or less. Rate of rise is determined by closing off gate valve 16. Some amount of rise in the pressure measured by the ion gauge is to be expected, because the chamber may still be outgassing. Outgassing is the desorption of gases from the walls or structures in the interior of the vacuum system 10 and can cause a rise in the pressure in chamber 14, especially in the early period after gate valve 16 is closed. When gate valve 16 is closed, the pump has no way to keep up with a leak in chamber 14. Therefore, there is a high likelihood that the rate of rise will be appreciably higher than expected when there is a leak in the chamber. On the other hand, if the rate of rise passes, then there is very little likelihood of a leak in chamber 14. A failure in the rate of rise with no failure in the base pressure is Failure Category 2, and indicates the failure was caused on the chamber side of vacuum system 10.

A leak in chamber 14 may be all the way through from ambient air, but it may also be from the bakeout lamps. The lamps may leak argon into the chamber and cause a higher than expected rate of rise without being too much to affect the base pressure. Therefore, a leak in the bakeout lamps may indicate a Category 2 failure. A test will be described below which may confirm or eliminate a leak in the lamps.

When a vacuum system 10 has not been thoroughly tested in the vacuum test, there may still be a considerable amount of gases in the structure of the vacuum system 10 that have not degassed. In such a case, the rate of rise may be higher than normal. Therefore, an under-baked-out chamber may present a Category 2 failure. If the vacuum test was performed for a sufficiently long period of time, however, it would be very unlikely to be under-baked-out. Thus, some kind of leak in chamber 14 is the most likely cause of a Category 2 failure.

A failure in both the base pressure and the rate of rise may hide the existence of a leak in pump 12, because the failure in the rate of rise makes it very likely that there is a failure in chamber 14, while there may or may not be a failure in pump 12. The failure of the rate of rise, however, is still an indicator that the most likely cause of the failure is in the chamber 14. In which case, the additional failure in the base pressure may indicate that a leak in chamber 14 is quite substantial. A failure in both the base pressure and the rate of rise is Failure Category 3, and it indicates that the chamber 14 is the most likely cause of the failure, while in rare cases there may be a failure in the pump 12. In even rarer cases, the ion gauge may be contaminated.

After the failure category has been determined, and the most likely section of vacuum system 10 to have failed is determined, it is possible to narrow the cause of the failure even further. A residual gas analyzer (RGA) can help narrow the cause. Among other things, an RGA can measure the partial pressures of residual gases in a system. An RGA may access the vacuum system's interior through a port in the chamber. The RGA can provide readings during vacuum testing of the partial pressures of several gases according to their center mass or molecular weight.

Figure 2:
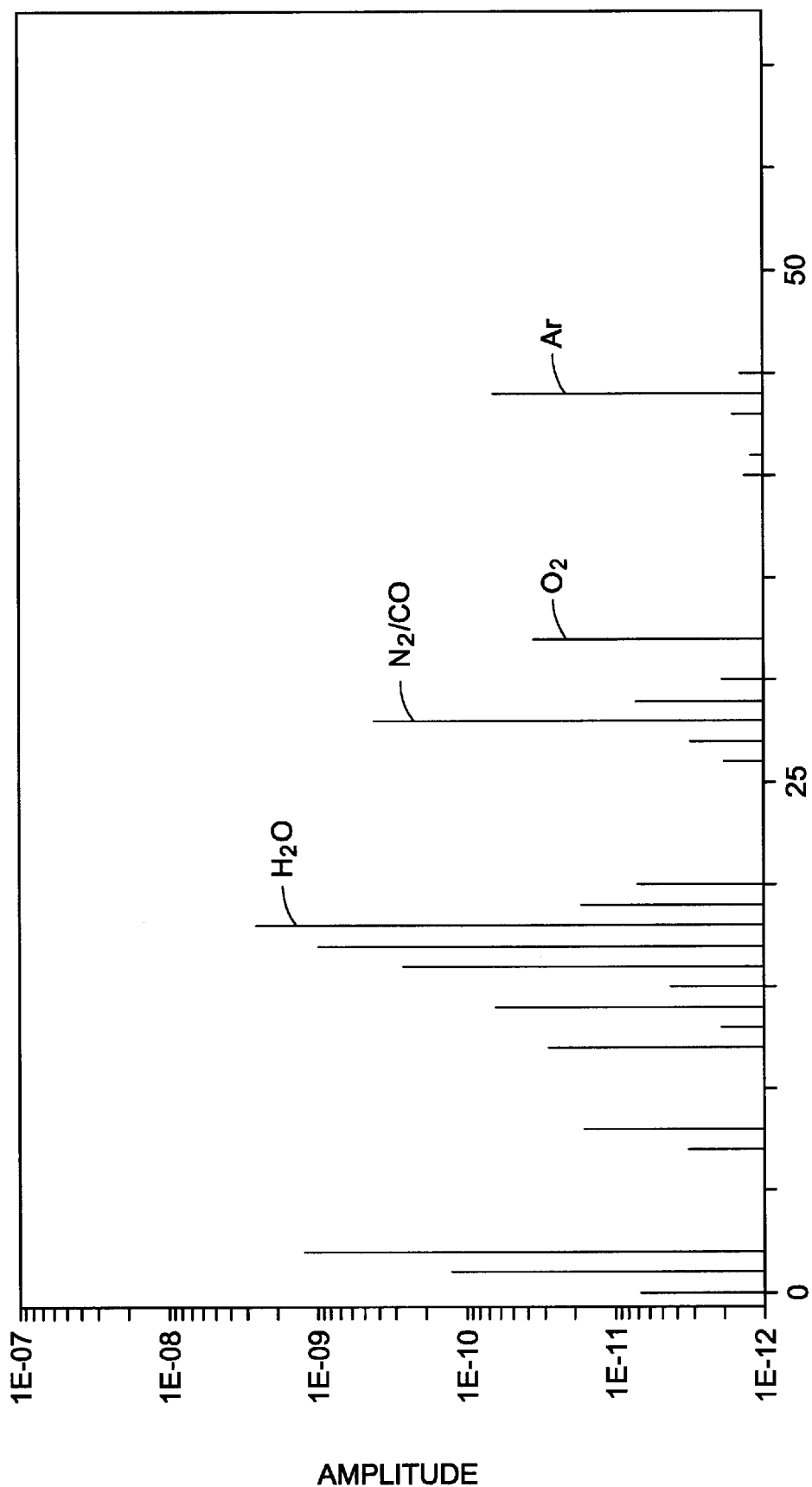
FIG. 2 is a bar chart of the partial pressures of certain gases within a vacuum system that has not failed.

The center mass of a hydrogen $H_2$ molecule is 1+1=2; the center mass of water vapor $H_2O$ is 1+1+16=18; the center mass of nitrogen $N_2$ is 14+14=28; the center mass of carbon monoxide CO is 12+16=28, the center mass of oxygen $O_2$ is 16+16=32, the center mass of argon Ar is 40; and the center mass of carbon dioxide $CO_2$ is 12+16+16=44. The bar chart in FIG. 2 shows the amplitudes of ion current, proportional to the partial pressure, of several gases as may be determined by an RGA for a normal vacuum system with gate valve 16 open and with no failures. The readings for $H_2O$, $N_2$, CO, $O_2$, and Ar are marked. The reading for water vapor is the highest under normal conditions because water vapor and other gases can permeate through the O-ring into the vacuum chamber as described above. Nitrogen and carbon monoxide are shown together because their center masses are the same.

Figure 3:
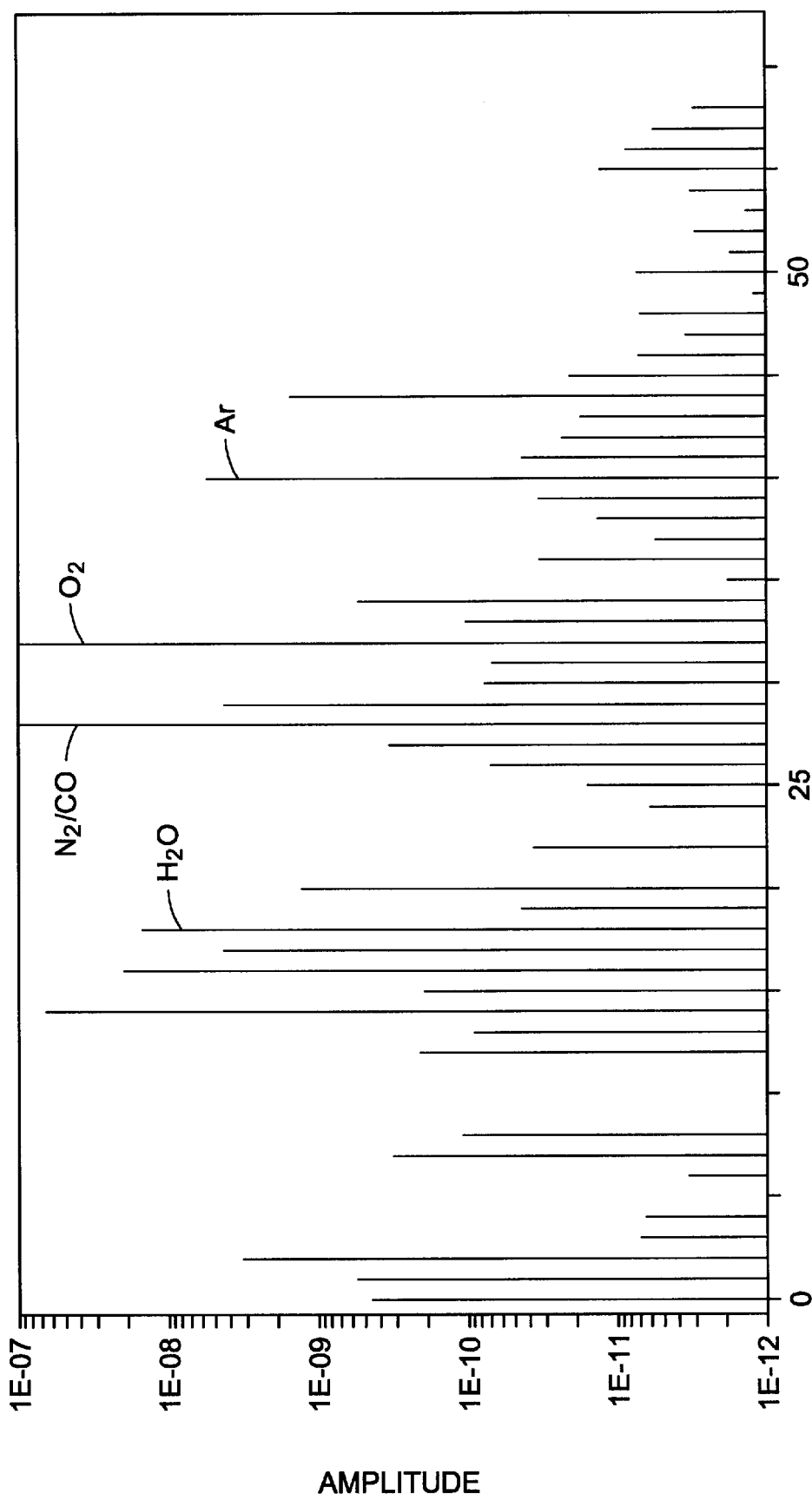
FIG. 3 is a bar chart of the partial pressures of certain gases within a vacuum system that has failed.

The bar chart in FIG. 3 shows the amplitudes of ion current, proportional to partial pressures, determined by a RGA for a vacuum system with a leak. The gases commonly found in air are shown with significantly higher amplitudes than in FIG. 2 because air is leaking into the system. In fact, nitrogen/carbon monoxide and oxygen are actually higher than water vapor. The sign that the vacuum system has a leak is that one or more of these gases or argon are higher than water vapor. This test can be used with a Category 1 failure to confirm whether there is a leak in the pump side.

If this test shows that there is not a leak in the pump side, then the next likely cause of the problem is that the cryopump is too slow or inefficient to reduce the pressure in the system to the qualifying pressure, as described above. In that case, it may be possible to regenerate the pump and see if the problem clears up. Regeneration removes the captured gases from the cryopump that the cryopump removed from the chamber, so the cryopump may be able to operate more efficiently. If this action doesn't solve the problem, then perhaps the ion gauge is contaminated and needs to be replaced; although, that is unlikely.

The above described test with the RGA bar chart when gate valve 16 is open does not work well with Category 2 and 3 failures since the best indicator of these failures is a failed rate of rise, which is determined with gate valve 16 closed over a period of time. For these categories of failure, the RGA may be used to determine the change in partial pressures of significant gases over a period of time.

Figure 4:
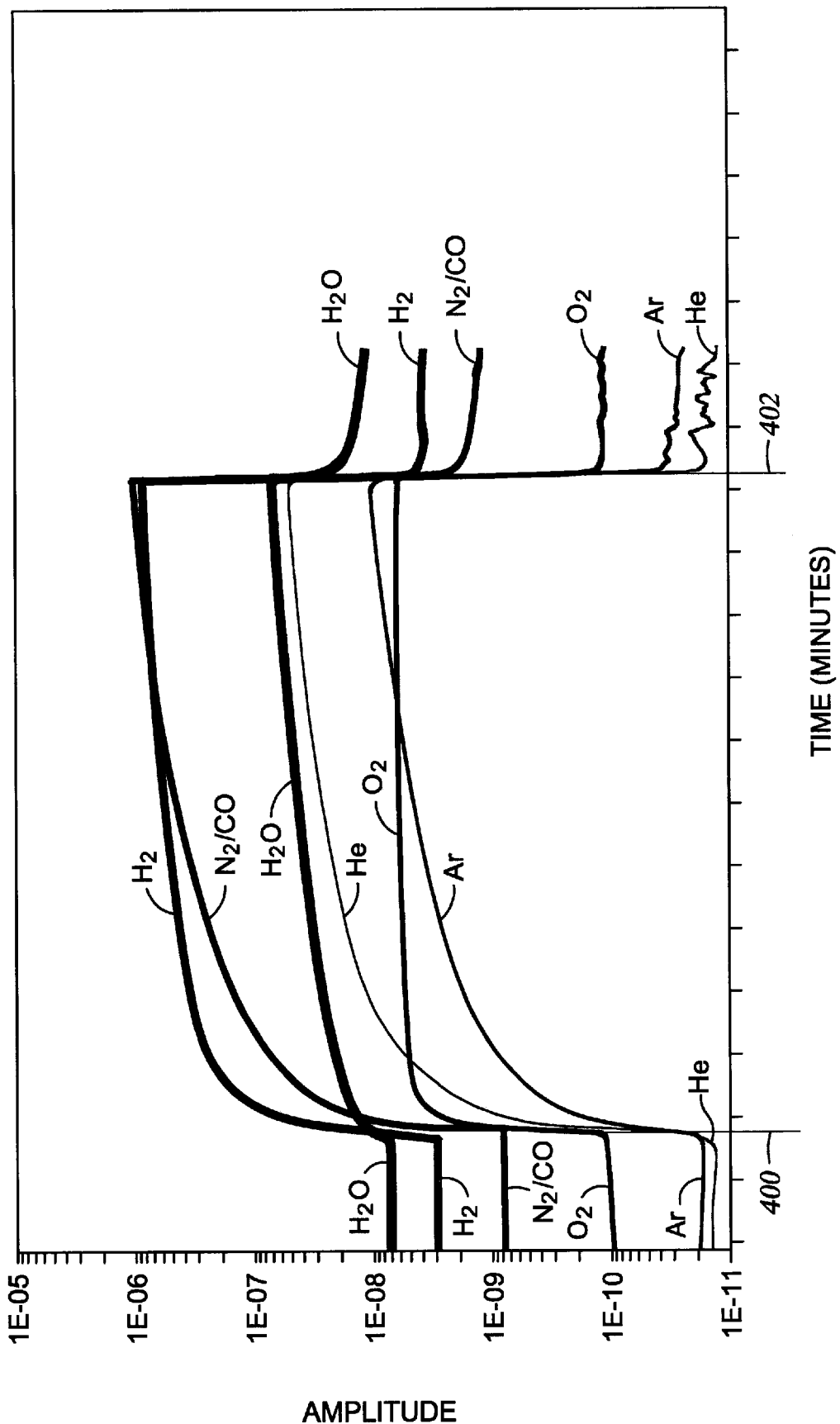
FIG. 4 is a graph of the partial pressures of certain gases over time within a vacuum system that has not failed.

FIG. 4 shows the partial pressures of molecules of water vapor, hydrogen, nitrogen, carbon monoxide, oxygen, argon and helium measured over a time period of approximately ten minutes for a vacuum system 10 with no leak. Prior to time 400, gate valve 16 is open, so the pump maintains all of the partial pressures at a constant level. Water vapor has the highest partial pressure because water vapor and other gases can permeate through the O-ring into the vacuum chamber under ultra high vacuum. At time 400, gate valve 16 closes and stays closed until time 402. During this time, the partial pressures are allowed to drift due to the normal rate of rise in any vacuum system. All of the partial pressures rise, but normally hydrogen and nitrogen/carbon monoxide rise above water vapor, while helium, oxygen and argon stay below water vapor. At time 402, gate valve 16 is opened again, and the pump can quickly pump the partial pressures back down to their original values.

Figure 5:
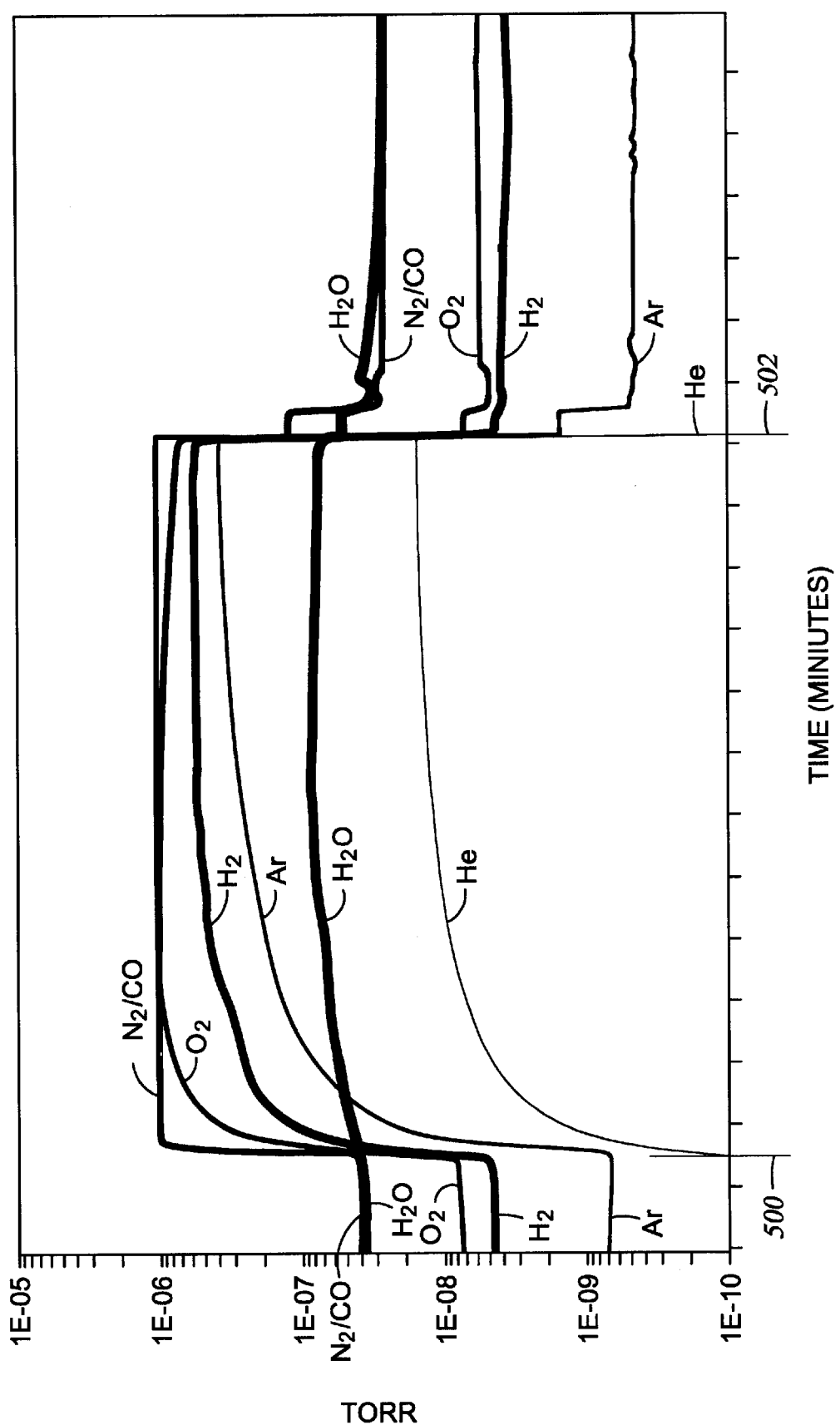
FIG. 5 is a graph of the partial pressures of certain gases over time within a vacuum system that has failed.

FIG. 5 shows the partial pressures of the same gases over a time period of approximately five minutes for a vacuum system 10 with a leak. Prior to time 500, gate valve 16 is open, so the pump maintains all of the partial pressures at a constant level. Once again, water vapor has the highest partial pressure. At time 500, gate valve 16 closes and stays closed until time 502. During this time, the partial pressures drift due to the rate of rise, but this time the relative partial pressures are very different from those in FIG. 4, while gate valve 16 was closed. This time, only helium still has a lower partial pressure than that of water vapor, while hydrogen and nitrogen/carbon monoxide still rise above water vapor, but now oxygen and argon also rise above water vapor. The fact that oxygen and argon have risen above water vapor is the sign that there is a leak in vacuum system 10 from ambient air. A high temperature inside vacuum system 10 may cause a more rapid degassing, resulting in a higher than expected rate of rise, so the temperature of the chamber should be checked, too. At time 502, gate valve 16 is opened again, and the partial pressures quickly return to their original values. Since gate valve 16 is closed between time 500 and time 502, the diagnosis of a leak applies only to chamber 14. Thus, this test can be used on Category 2 and 3 failures to confirm the existence of a leak in chamber 14. If no leak is determined, then the system may just need a longer time for the chamber vacuum test.

Figure 6:
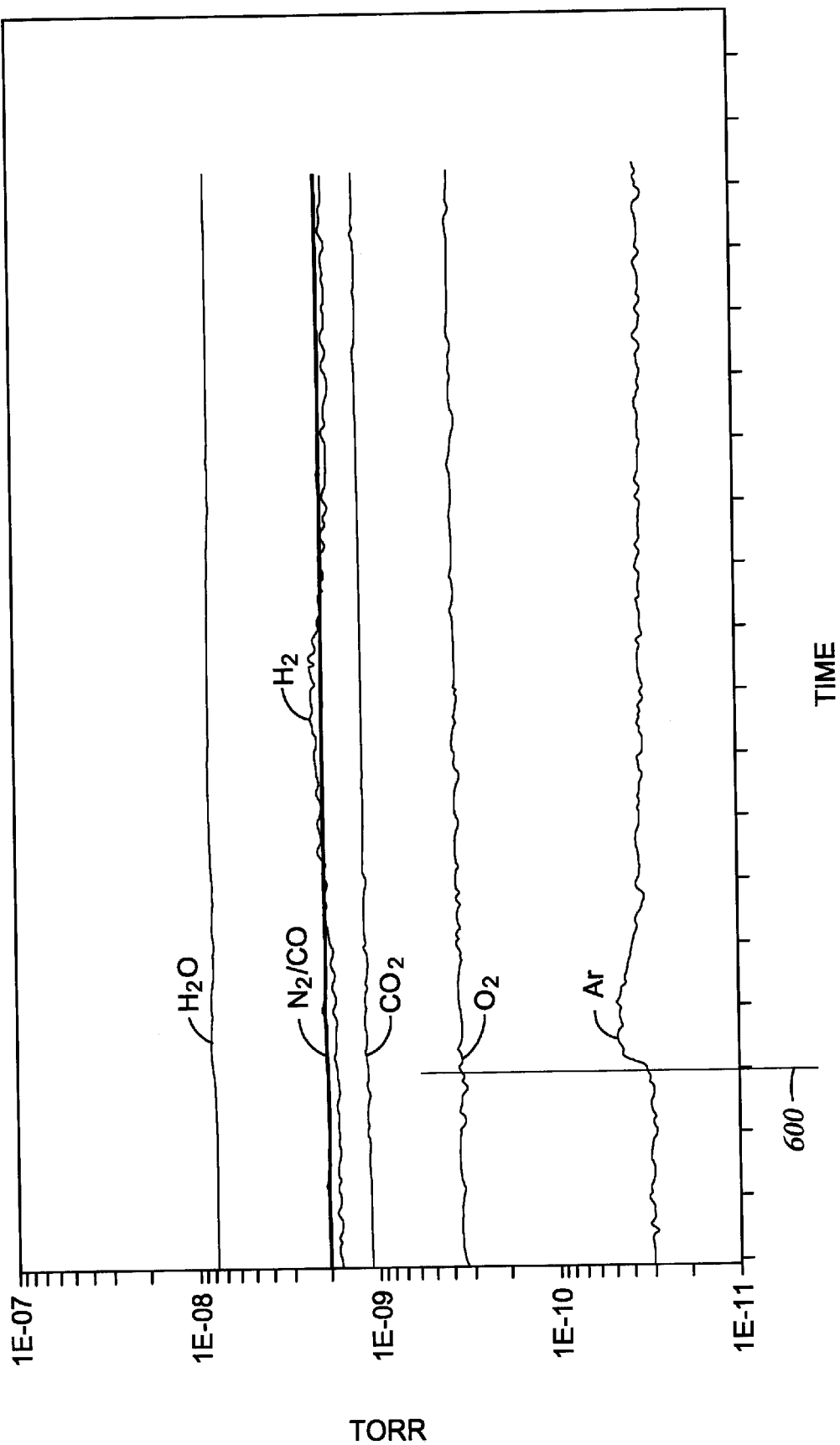
FIG. 6 is a graph of the partial pressures of certain gases over time while turning on the lamps within a system that has not failed.

If the bakeout lamps are the cause of the failure in chamber 14, then they will leak argon into chamber 14. FIG. 6 is a graph from an RGA showing the partial pressures of several key gases over a period of about seven minutes in a vacuum system 10 with good lamps (no leaks) and under constant ultra high vacuum. Prior to time 600, the lamps are off, and vacuum system 10 is in a steady state. At time 600, the lamps are turned on and the partial pressure for argon goes up for a short time and then returns to the former steady state. The partial pressures of the other gases remain fairly level. When the lamps are turned on, they start to heat up vacuum system 10. The partial pressure of argon rises when the system starts to heat because argon follows the ideal gas law; so as the temperature rises, the pressure rises, too. Also, the increased heat causes the system to degas more quickly, thus raising the partial pressure. The partial pressure of argon returns to the former steady state, because the pump continues to maintain the ultra high vacuum and soon pumps the partial pressure back to normal. This graph shows the expected behavior of the partial pressures for a good vacuum system 10.

Figure 7:
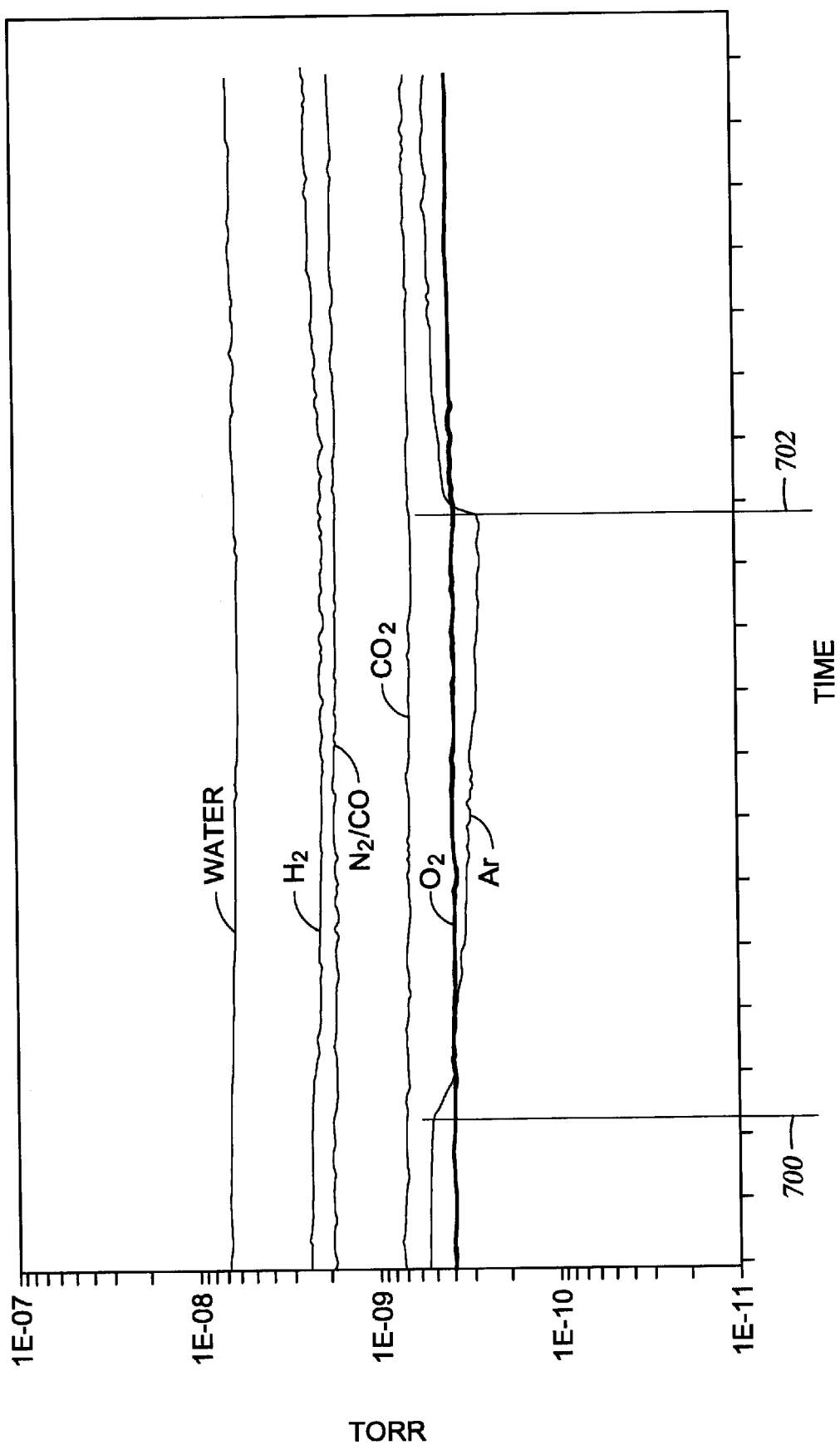
FIG. 7 is a graph of the partial pressures of certain gases over time while turning off and on the lamps within a system that has failed.

FIG. 7 shows a graph from an RGA showing the partial pressures of the same gases as in FIG. 6 under a constant ultra high vacuum for a period of about seven minutes, but in a vacuum system 10 with lamps that leak. Prior to time 700, the lamps are on and the system is in a steady state. At time 700, the lamps are turned off until time 702. The partial pressure of argon begins to change as soon as the lamps are turned off, but the partial pressure does not return to the same steady state as before the lamps were turned off. Instead, the new steady state for the partial pressure of argon is lower than previously. At time 702, the lamps are turned back on, and the partial pressure of argon quickly jumps back up to the higher steady state. Such a graph indicates that the lamps are leaking argon, and the leak is higher when the lamps are on than when off, thus the two different steady state conditions. Additionally, the fact that argon is getting into the system from somewhere is shown by a comparison of FIGS. 6 and 7. The partial pressure of argon in FIG. 6 is about $2 \times 10^{-11}$ torr, but the partial pressure of argon in FIG. 7 is above $2 \times 10^{-10}$ torr, a whole order of magnitude higher than the expected partial pressure for a good system in FIG. 6.

Figure 8:
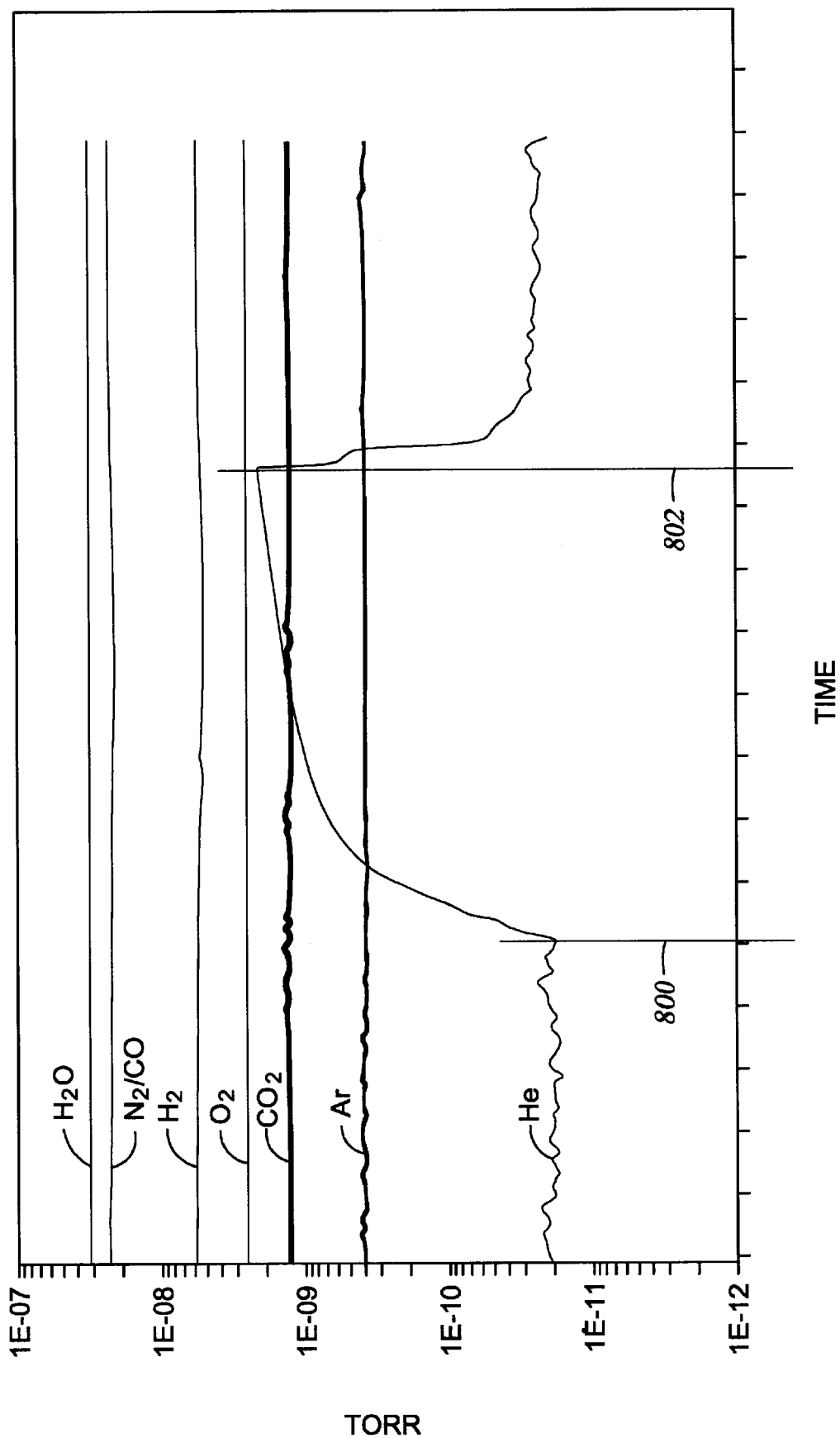
FIG. 8 is a graph of the partial pressures of certain gases over time within a system having a leak while moving a source of helium around the outside surface of the system.

After determining that there is a leak in vacuum system 10 from ambient air, it is possible to determine the location of the leak in each of the Failure Categories. FIG. 8 shows a graph from a RGA showing the partial pressures of several important gases in a vacuum system 10 under a constant ultra high vacuum for a period of about five minutes. Prior to time 800, the system is in a steady state. There is a leak in the system, but the pump can hold the system steady. At time 800, the partial pressure for helium suddenly jumps and rises by almost two orders of magnitude, as helium is coming in through the leak in the system. At time 802, the helium stops coming in through the leak, and the system quickly returns to the steady state. This condition can occur when a source of helium is applied outside vacuum system 10 at the location of the leak from ambient air. Thus, the location of a leak in vacuum system 10 can be determined by slowly moving the source of helium around the outside surface of the system while watching for a rise in the partial pressure of helium on the RGA. This method can be used for any of the categories of failure when a leak is suspected. Gases other than helium may be used.

For a Category 3 failure, if the above diagnosis procedures do not locate the problem in the chamber, then the vacuum system may have one of those rare cases in which a Category 3 failure is caused by the pump side. In this case, the pump may have to be changed.

Figure 9:
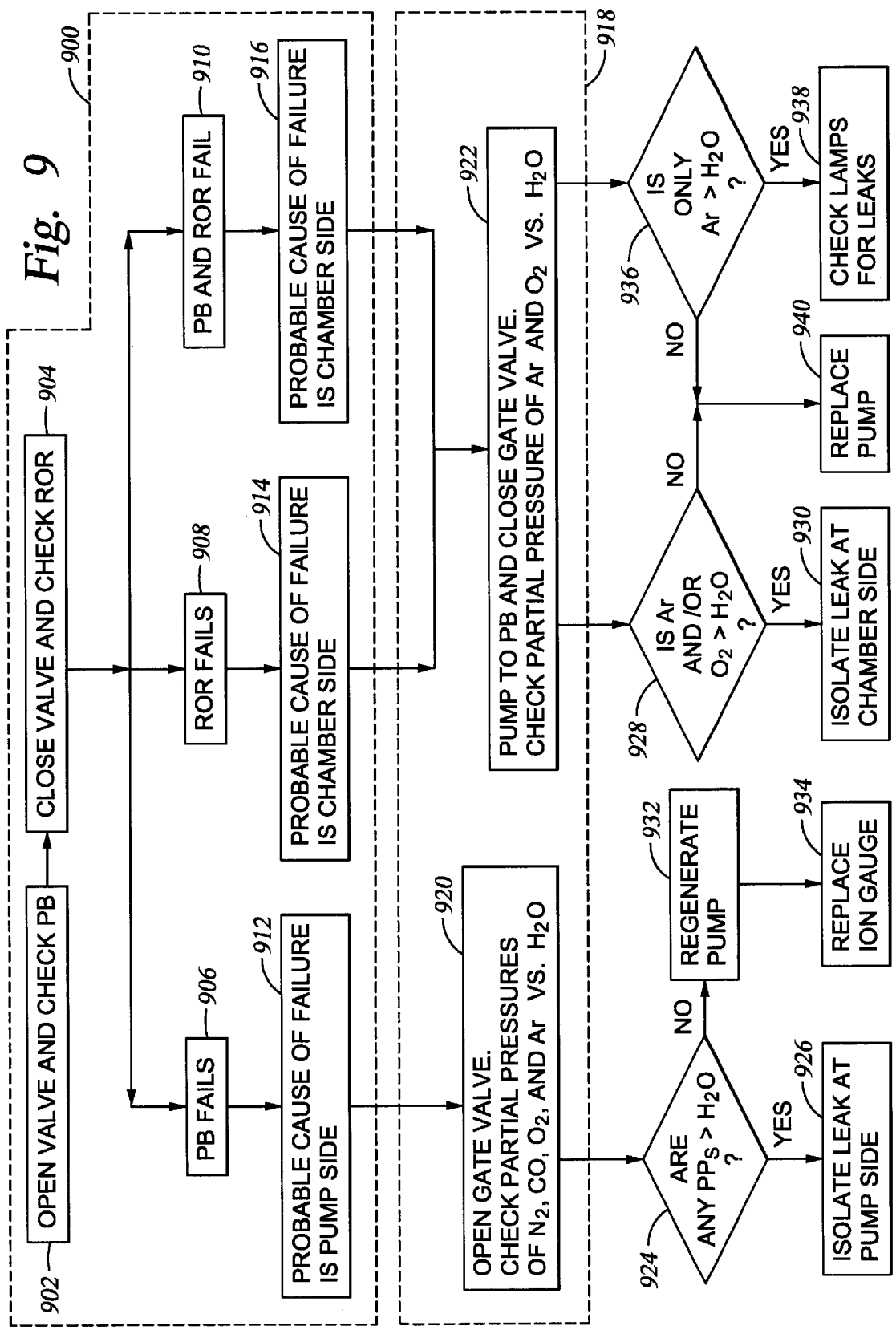
FIG. 9 is a flow chart generally summarizing the method of the present invention.

FIG. 9 shows a flow chart summarizing the method of the present invention. Initially, a determination is made as to whether the likely cause of failure is the pump side or the chamber side. This involves categorizing the results of a Pb and ROR test as shown in block 900. Once the gate valve is opened, the chamber is allowed to reach a Pb which is measured and recorded as indicated by step 902. In step 904, the gate valve is closed and the ROR is checked and recorded. The recorded values for Pb and ROR are compared against predetermined pass/fail values. Steps 906–910 indicate the categorization according to whether the chamber exhibits a Pb failure (a category I failure), an ROR failure (a category II failure), or both (a category III failure). In a category I failure (Pb failure), the probable cause is the pump side, as indicated at step 912, which is generally understood to be the pump and/or the gate valve. Category II and III failures both exhibit an ROR failure and the probable cause of failure is the chamber side as indicated by steps 914–916. The chamber side comprises the chamber body, the ion gauge and any lamps. However, as described above, a chamber side failure generally indicates a leak in the chamber body.

Block 918 shows the next phase of the present invention wherein the probable cause of failure, as determined by block 900, is further confirmed or rejected. For this purpose, the method of the present invention uses two distinct tests, one for category I failures and another for category II and III failures. Step 920 indicates the test for category I failures. As described above, the gate valve is first opened and the chamber is pumped down. The partial pressures of $N_2$, CO, $O_2$, and Ar are then compared to the partial pressure of water vapor. The test for category II and III failures, shown by step 922, is performed with the gate valve closed after pumping the chamber to its Pb. A few minutes (approximately two) are allowed to elapse and then the partial pressures of Ar and 02 are compared against that of water vapor.

After each test in block 918, the results are analyzed to determine whether a leak is confirmed. In the case of category I failures, where the partial pressures of $N_2$, CO, $O_2$, and Ar are higher than that of water vapor a leak is confirmed. The leak is subsequently isolated by moving an inert gas source (such as helium) around the pump side as indicated by steps 924 and 926. Where a leak cannot be confirmed the pump may need to be regenerated as indicated by step 932. If regeneration is unsuccessful, the ion gauge may need to be replaced as indicated by step 934.

Similarly, category II and III failures are confirmed where the partial pressures of Ar and $O_2$ are higher than that of water vapor as shown by step 928. In that case, the leak is isolated by moving an inert gas source around the chamber side as indicated in step 930. Additionally, as indicated by steps 936 and 938, where the chamber is equipped with lamps and only the partial pressure of Ar is greater than that of water vapor, the lamps should be checked for leaks according to the procedure described above. In the rare case where no chamber side leak can be confirmed for category III failures, the pump may be the source of a leak and should be replaced if necessary.

While the foregoing is directed to the preferred embodiment of the present invention, other and further embodiments of the invention may be devised without departing from the basic scope thereof, and the scope thereof is determined by the claims which follow.

What is claimed is:

1. A method for determining a leak location in a vacuum system having a pump side and a chamber side, the method comprising:

testing the vacuum system to determine if a base pressure failure is present:

testing the chamber side to determine if a rate of rise failure is present;

determining the likely location of the leak to be in the chamber side if the rate of rise failure is present and the base pressure failure is not present;

determining the likely location of the leak to be in the pump side if the base pressure failure is present and the rate of rise failure is not present; and determining the likely location of the leak to be in the chamber side if both the rate of rise failure and the base pressure failure are present.

2. The method of claim 2 further comprising:

monitoring a quantity of a first substance in the chamber;

moving a source of the first substance around an outside surface of the chamber; and isolating the leak to a location adjacent the source of the first substance when the quantity of the first substance in the chamber rises.

3. The method of claim 2 wherein the first substance is a detectable gas.

4. The method of claim 2 further comprising:

replacing a pump in the pump side when the likely location of the leak is determined to be in the chamber side, and the steps of monitoring, moving, and isolating do not isolate the location of the leak.

5. The method of claim 2 wherein the pump side comprises a pump and the valve.

6. The method of claim 1 further comprising:

(d) pumping the vacuum system;

(e) determining a quantity of at least one second substance in the vacuum system;

(f) determining a quantity of a third substance in the vacuum system; and (g) comparing the quantity of the at least one second substance with the quantity of the third substance, a greater quantity of the at least one second substance than of the third substance indicating that the cause of the failure is a leak.

7. The method of claim 6 wherein pumping the vacuum system comprises pumping the vacuum system to a base pressure and then isolating the pump from the chamber.

8. The method of claim 7 wherein the at least one second substance is a detectable gas selected from the group consisting of argon, oxygen and any combination thereof.

9. The method of claim 8 wherein the third substance is water vapor.

10. The method of claim 1 further comprising:

(d) determining a base pressure of the system;

(e) comparing the base pressure with a qualifying pressure, a base pressure greater than the qualifying pressure indicating that the vacuum system has a base pressure failure; and (f) t determining the likely location of the leak to be in the pump side when the vacuum system has a base pressure failure and does not have a rate of rise failure.

11. The method of claim 10 further comprising:

(g) pumping the vacuum system;

(h) determining a quantity of at least one second substance in the vacuum system;

(i) determining a quantity of a third substance in the vacuum system; and (j) comparing the quantity of the at least one second substance with the quantity of the third substance, a greater quantity of the at least one second substance than of the third substance indicating that the cause of the failure is a leak.

12. The method of claim 11 wherein the at least one second substance is a detectable gas selected from the group consisting of nitrogen, carbon monoxide, oxygen, argon and any combination thereof.

13. The method of claim 10 further comprising:
(g) monitoring a quantity of a first substance in the chamber;
(h) moving the source of the first substance around an outside surface of the pump side when the likely location of the leak is determined to be in the pump side; and
(i) isolating the leak to a location adjacent the source of the first substance at which the quantity of the first substance in the chamber rises.

* * * * *

UNITED STATES PATENT AND TRADEMARK OFFICE
CERTIFICATE OF CORRECTION

PATENT NO.    : 6,349,589 B1                                                    Page 1 of 1
DATED         : February 26, 2002
INVENTOR(S)   : Zhou It is certified that error appears in the above-identified patent and that said Letters Patent is hereby corrected as shown below:

Column 9,
Line 27, please change "02" to -- $O_2$ --.

Column 10,
Line 51, please change "(f) t determining" to -- (f) determining --.

Signed and Sealed this

Fifth Day of August, 2003

JAMES E. ROGAN
*Director of the United States Patent and Trademark Office*